United States Patent [19]
Lambert

[11] 4,201,157
[45] May 6, 1980

[54] PORTABLE ANIMAL HANDLING UNIT

[76] Inventor: Joe Lambert, Smith Center, Kans. 66967

[21] Appl. No.: 909,544

[22] Filed: May 25, 1978

[51] Int. Cl.² ............................................. A01K 29/00
[52] U.S. Cl. ....................................... 119/82; 119/20
[58] Field of Search ....................... 119/82, 98, 99, 20; 280/30

[56] References Cited

U.S. PATENT DOCUMENTS

| | | | |
|---|---|---|---|
| 2,593,559 | 4/1952 | Heldenbrand | 119/82 |
| 2,935,965 | 5/1960 | Smith | 119/82 |
| 3,020,882 | 2/1962 | Browning | 119/82 |
| 3,538,889 | 11/1970 | Keller et al. | 119/82 |
| 3,741,529 | 6/1973 | Blagg | 119/20 |
| 3,796,191 | 3/1974 | McIntire | 119/82 |
| 3,894,515 | 7/1975 | Plyler | 119/82 |
| 3,929,104 | 12/1975 | Corbin | 119/82 |

FOREIGN PATENT DOCUMENTS 292428 10/1966 Australia ...................................... 119/82

*Primary Examiner*—Jay N. Eskovitz
*Attorney, Agent, or Firm*—Richard D. Law

[57] ABSTRACT

A wheeled frame having sidewalls and bed forming an animal walkway, and a self-contained hydraulic system to move the bed of carriage from an elevated travel position to a general ground level for passing animals through the unit, and a front elevating assembly for forming the frame into a chute for loading animals into vehicles with elevated floors. The sidewalls are arranged to be movable in relation to each other changing the width of the animal walkway, and at least one sidewall is bottom pivoted to form an animal squeeze cage, with gates in the sidewalls for permitting access to held animals.

8 Claims, 14 Drawing Figures

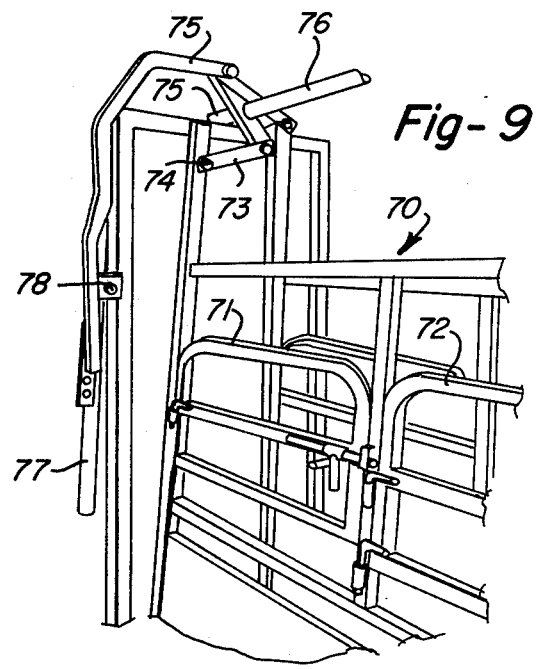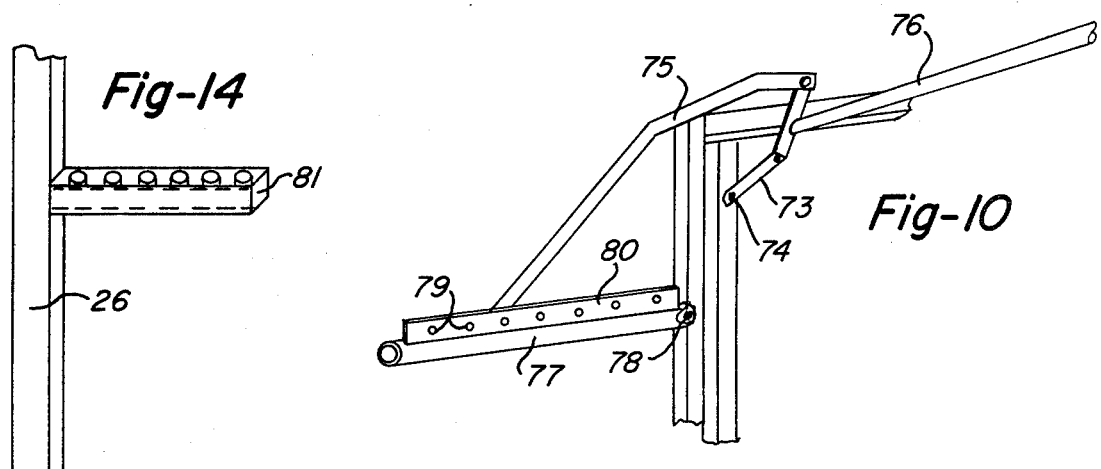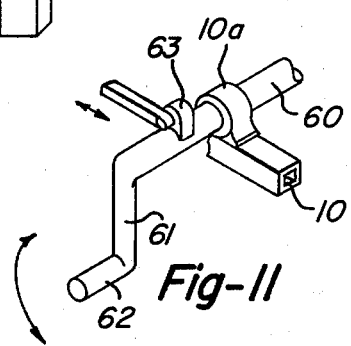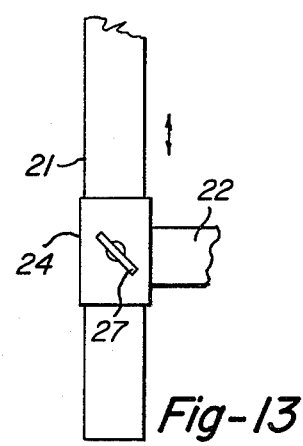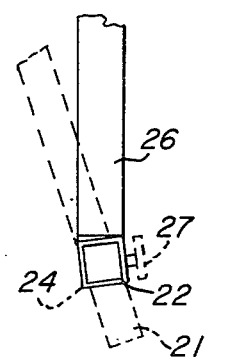

PORTABLE ANIMAL HANDLING UNIT

In ranching and farming operations, it is often necessary to transport, treat, manipulate or otherwise handle large animals such as horses, cattle, sheep, etc. For transportation, for example, such animals are walked up ramps from ground level to the elevated platform of the transportation vehicle (trucks, trailers, train cattle and sheep cars, etc.). A ramp is not always handy at the field location of the animals, so it is ncessary to drive the animals to a prepared vehicle boarding site, but this procedure is not always desirable or convenient. At times it is necessary to treat farm animals, e.g. giving shots, branding, treating wounds, etc. and it has heretofore been necessary to move the animals from pasturing to pens having handling facilities or the like, which may be some distance apart. The usual procedure has been to drive the animals to the locations where the necessary handling could be complete with stationary animal handling equipment.

THE PRESENT INVENTION

The present invention provides a self contained, mobile animal handling means, providing a complete facility for catching and holding pens, a loading and unloading ramp, animal handling passage, animal holding chute, and means for changing width of the passage and ramp means for various sizes of animals. The apparatus is mounted on wheels for transporting to desired locales, and means are provided for carrying lengths of mobile fences for stock pens and the like.

OBJECTS AND ADVANTAGES OF THE INVENTION

Included among the objects and advantages of the invention is to provide a self contained mobile animal handling unit arranged for flush-ground use as animal handling apparatus or sloped for use as a ramp, including stock pen fencing.

Another object of the invention is to provide a mobile animal handling chute for ground level use or sloped chute use.

Still another object of the invention is to provide a mobile chute for an animal ramp, having end side rails arranged to maintain a vertical position at various angles of slope.

A further object of the invention is to provide an animal chute having means for adjusting its width to accomodate different sizes of animals.

Yet another object of the invention is to provide an animal chute arranged as an animal squeeze holder for treating the held animal and including gates for access to the sides of the held animal.

An additional object of the invention is to provide hydraulic means to change a mobile animal handling assembly from a ground level animal chute arrangement to an elevated travel arrangement.

A further additional object of the invention is to provide a self contained animal handling apparatus arranged to be set up in an open field without additional equipment.

These and other objects and advantages of the invention may be ascertained by referring to the following description and illustrations.

GENERAL DESCRIPTION OF THE DRAWINGS

FIG. 9 is a detailed perspective view of the animal holding sidewall assembly, with animal inspection gates;

FIG. 10 is a detailed view of the operating mechanism for sidewall shown in FIG. 9;

FIG. 11 is a detailed perspective view of a wheel raising and lowering activator;

FIG. 12 is a schematic end view of the runway support means;

FIG. 13 is a schematic view of the support lock means; and

FIG. 14 is a schematic end view of a fence holding support for the animal holding means.

SPECIFIC DESCRIPTION OF THE DRAWINGS

Figure 1:
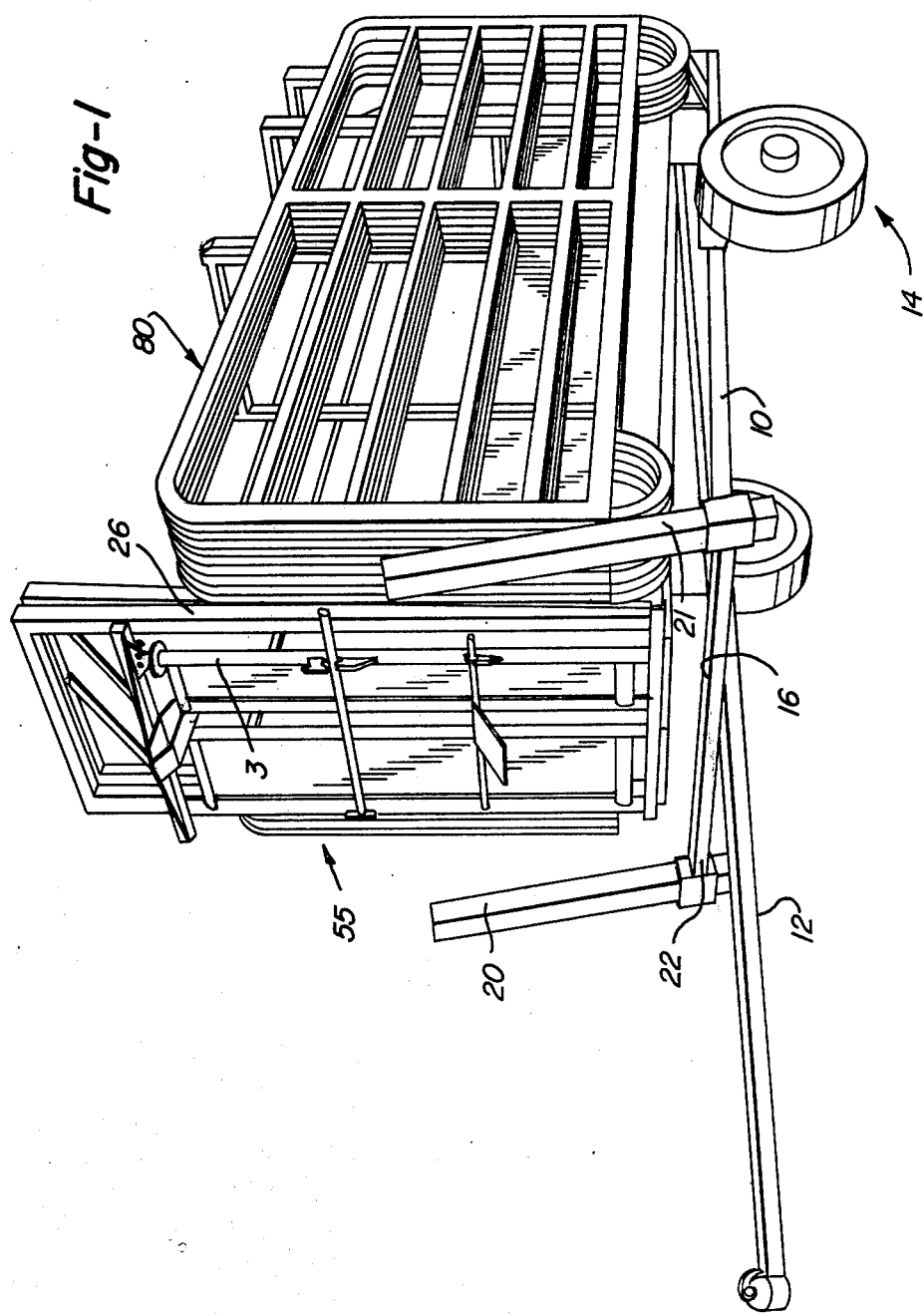
FIG. 1 is a perspective view of a mobile animal handling assembly, according to the invention, in travel position and arranged to be towed as a trailer.

The device shown in FIG. 1 includes a frame with a bed 10 having an attached draft tongue 12 for attachment to a vehicle ball hitch (not shown) for towing. The frame is mounted on wheel assembly 14, described in detail below. A floor or bed 16 is mounted on the frame, providing a walkway for animals. A front support mount, including uprights 20 and 21, provide means for supporting the frame sloped at an angle. This forms a loading chute, with the floor sloped from the rear upwardly to the front. The uprights 20 and 21 are mounted in adjustable brackets providing variable heights for the front of the frame. As shown in FIGS. 13 and 14, upright 21 is mounted in a sleeve 24 depending from frame cross-member 22, passing laterally of the frame and extending beyond the sides of the frame. The cross member 22 is mounted at an angle, so that the uprights are deployed at an angle, forwardly of a front side upright 26 depending at a right angle from the frame. The supports are lockable in the sleeve, and one form is shown, where a handled bolt 27 provides a friction lock of the upright at any desired position. Sides 30 and 31 depend upwardly from the frame 10, forming the animal walkway or chute. The side ends are at right angles with the floor, and angularly adjustable extensions 33 at the front end 34 at the rear permits closing the angled gap between the vertical door of a vehicle and the vertical sides of the chute. An apertured strap 36 (an equivalent strap is on the opposite side) pivotally connected to the uprights of extension 33, pass through a loop 37, and pin 38 permits angled adjustment between the uprights. The extensions are pivotally mounted to the frame to allow the angled movement for adjustment. In a similar manner, both sides of the rear uprights are adjustably by equivalent adjustment means, shown generally by number 39. An "L" shaped bar 40 aids in closing the gap when the ends are angled outwardly.

Figure 3:
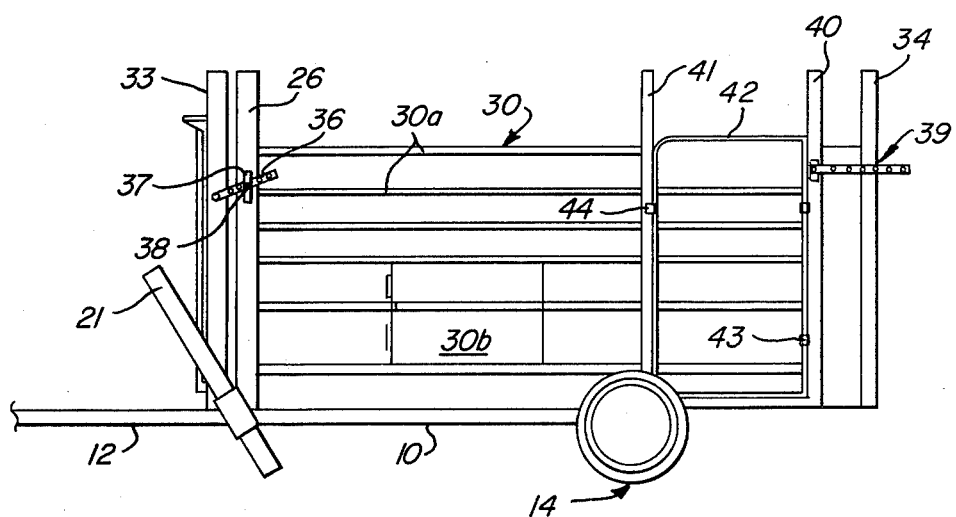
FIG. 3 is a side elevational view of an animal handling assembly, with its floor resting on the ground, forming an animal handling runway.
Figure 4:
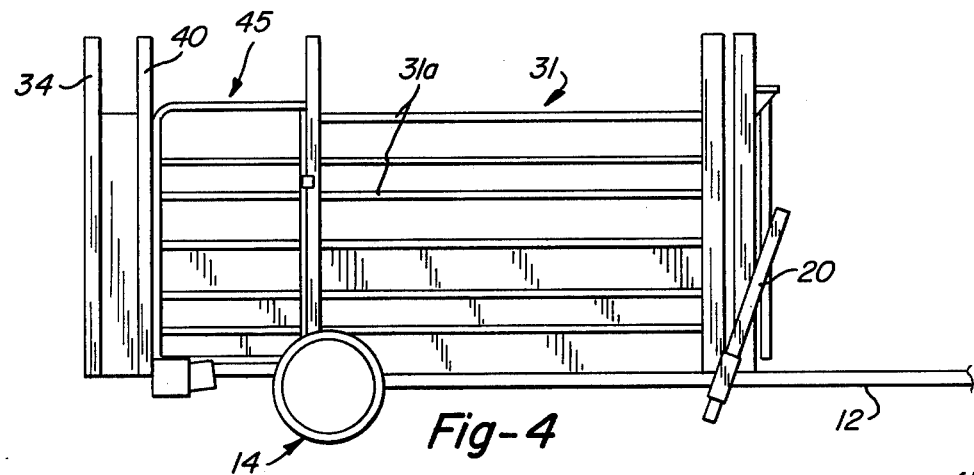
FIG. 4 is a side elevational view of the opposite side of that of FIG. 3, showing the animal handling apparatus in ground contact as a handling runway.
Figure 5:
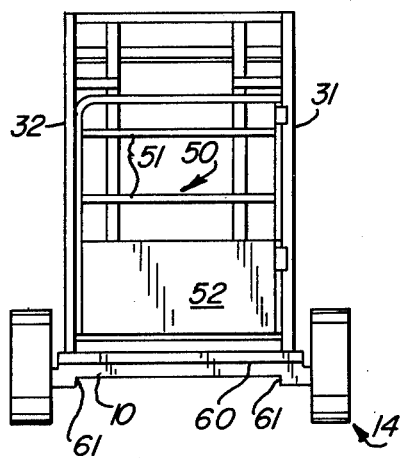
FIG. 5 is a rear elevational view of the animal handling assembly of the invention.

The sides of the unit, shown in FIGS. 3 and 4 include a left side (facing the tongue) 30 and right side 31. The left side includes forward upright 26, rearward upright 40, and intermediate upright 41. A stock inspection gate 42 is pivoted on hinges 43 so as to open rearwardly. A latch 44 for the gate controls opening. The side 30 includes a series spaced horizontally disposed bars 30a, and the bottom bars are covered with a sheet metal cover 30b, which prevents the stock from getting their legs caught in the bars.

In a similar manner, side 31 includes a gate 45, which is pivoted in hinges to swing forwardly. This opposite pivoting of the gates permits access to the chute even when it is adjacent a blocking obstruction on one side. The bars 31a are covered along the bottom bars by sheet metal, as on the other side.

Figure 6:
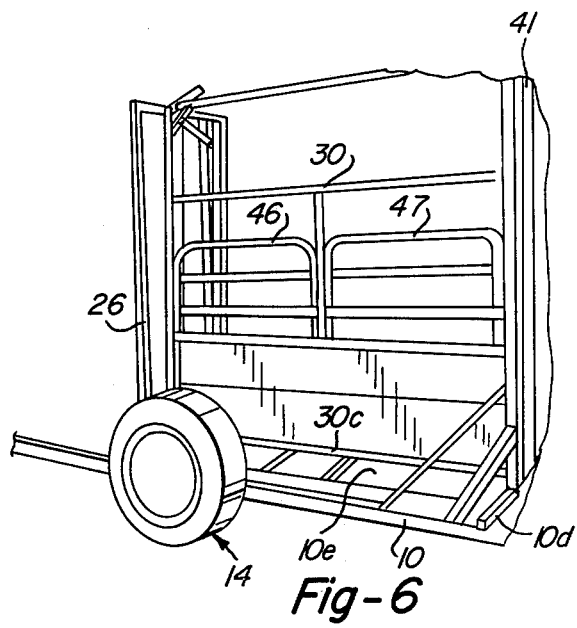
FIG. 6 is a detailed side elevational view of the animal handling apparatus showing the width adjustment of the runway to accomodate different sizes of animals.
Figure 7:
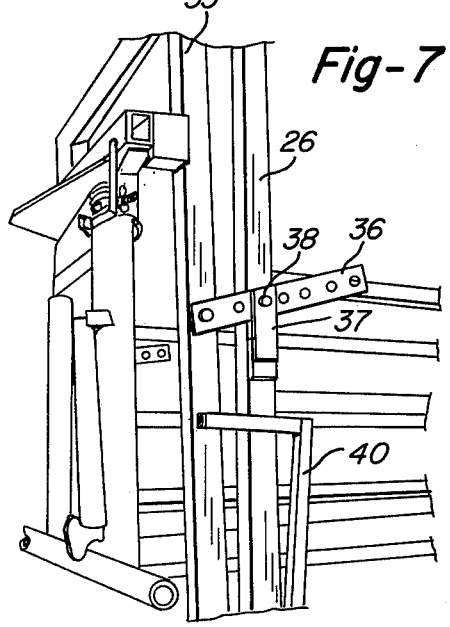
FIG. 7 is a detailed perspective view of an end of the device of the invention showing sidewall adjustment for the assembly of the apparatus with units of different heights.

One side of the unit preferably includes a pair of inspection gates in the open bars to permit inspection of a held animal, explained below. As shown in FIG. 6, a forward gate 46 and rear gate 47, may be included in bar framework of a side. Particularly when a side is pivoted inwardly to hold an animal (squeeze), the gates provide full access of the animal's body for manipulation such as branding, injections, etc.

Figure 2:
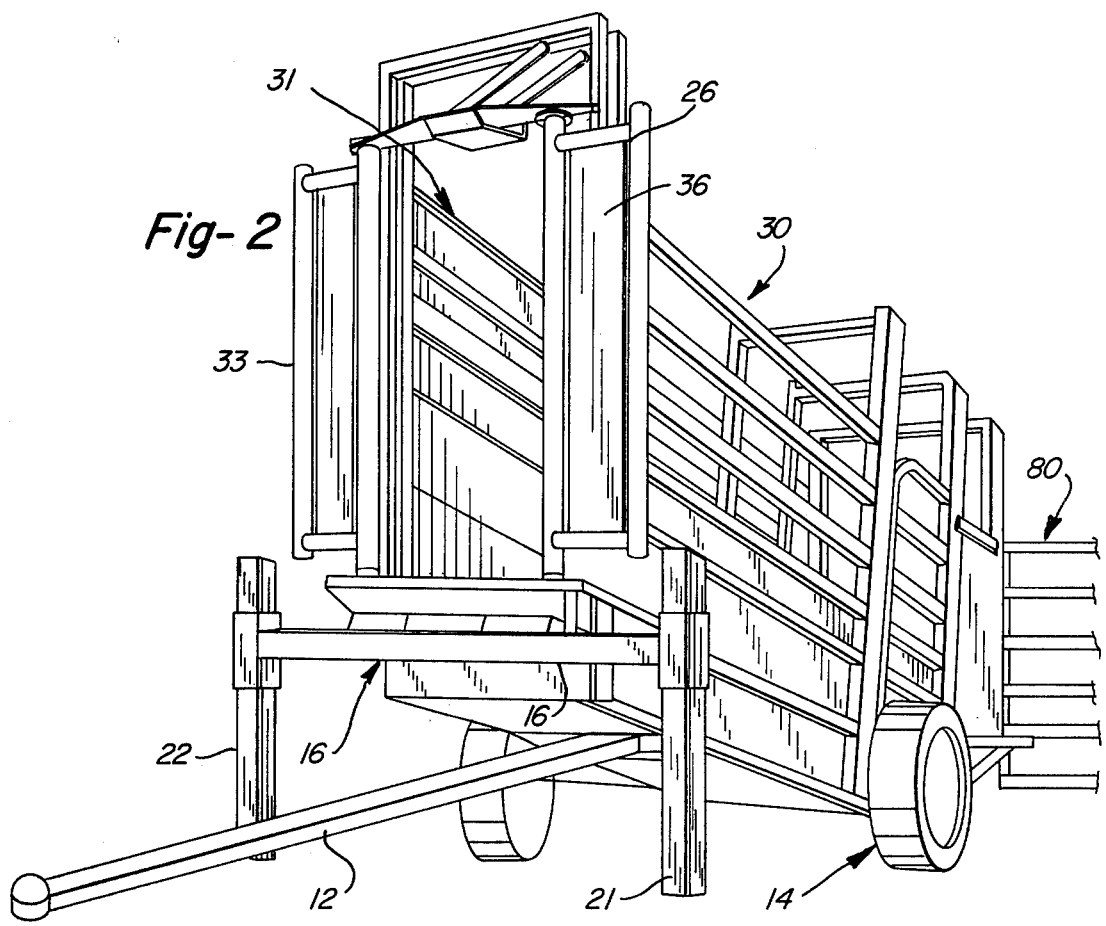
FIG. 2 is a perspective view of the device of FIG. 1 arranged as an animal loading ramp.

The rear opening between the side walls is closable by a gate 50 having open bars 51 and a sheet metal closure 52 along the bottom. The gate may be hinged to open in either direction. The front of the chute is closed by a gate. The gate 55 shown in FIG. 1 is an adjustable, central opening gate, arranged to hold an animal's head. The sides of the gate swing from each side for full opening of the chute. The central opening gate, allows for an animal's head to be held, while the animal is in the chute, helping to immobilize the animal for inspection or treatment. The gate is shown closed in FIG. 1 and open in FIG. 2. Other types of gates may be used for closing the front openings of the chute. The center opening gate, also, does provide easy access to an animal's ear for tagging or the like.

Figure 8:
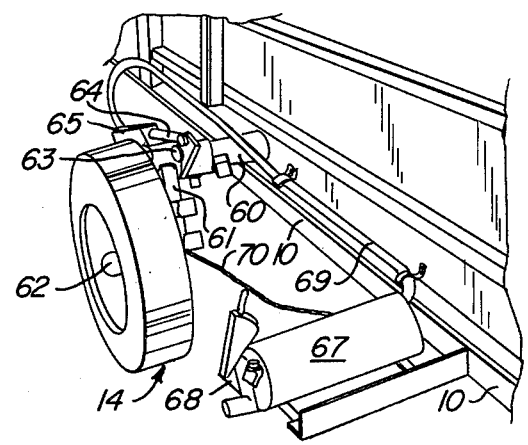
FIG. 8 is a detailed perspective view of a hydraulic system for raising and lowering the bed of the animal handling apparatus from ground level to travel position.

The frame 10 is mounted on a wheeled assembly arranged for lowering the frame so that it rests flat on the ground or raised for travel. The mechanism is shown in FIG. 8 and 11. A major axle 60 is pivotally mounted in pivots 10a on frame 10, at the desired position, and drop supports 61 at each side depend at right angles to the axle 60. Wheel axles 62 (FIG. 11) depend horizontally (right angles) to the supports 62, supporting the wheels. A pivot arm 63 is welded or otherwise secured to the axle 60, and the piston rod 64 of a hydraulic cylinder 65 is pivotally attached to pivot arm 63. A reservoir 67, having a manual pump 68, provides hydraulic fluid through lines 69 to the cylinder. The cylinder may be a single acting cylinder since the weight of the unit will permit lowering by releasing the hydraulic fluid from the cylinder. A safety chain 70 between the axle and the frame prevents accidental lowering of the wheels. The piston rod is pushed forwardly to rotate the axle 60 so that the wheels move rearwardly on the pivot of the axle 60, lowering the frame 10.

The animal handler is arranged to hold an animal in place by a squeeze chute, where one side is pivoted to move inwardly forcing the animal against the opposite wall. As shown in FIGS. 9 and 10, wall 70 (having inspection gates 71 and 72) is pivotally attached to the floor so that it can be tilted inwardly. A folding bar 73 pivoted to side 70 by pivot 74 is pivotally attached to handle 75. The handle is bent so as to pivot the folding bar 73 about pivot 76, mounted on the end frame, so that the wall 70 is tilted in and out by movement of the handle 75. A connecting rod 76 is pivotally attached to the frame of the other end in a similar manner, and it includes a folding bar pivoted to the side. A lever arm 77 is pivotally attached by pivot 78 to the upright of the end frame permitting the arm to pivot upwardly and downwardly. The handle 75 is connected to one of a series of apertures 79 on a flange 80 on the arm 77 for operating the handle 75. Thus, by attaching the handle (by a pin) to the outer hole, the wall is held in an upright position. When the handle is pinned to one of the inner holes, the wall may be made to tilt inwardly at different angles to hold different size animals. When the arm 77 is moved flush with the upright, this locks the squeeze in the tilt position holding the animal. Movement upwardly of the arm 77 unlocks the squeeze and opens it.

Fence portions or sections 80 are carried on the unit by stacking them on the sides on outstanding arms 81 (FIG. 14) which supports the fence sections. A plurality of such fence sections may be carried on each side, to provide for a catch pen, and a holding pen for animals to be passed through the chute. The sections of fence may easily be connected together for forming fence lines in open pastures for catching and holding animals.

The wall 31 is movable toward wall 30 to adjust the width of the chute. As shown in FIG. 6, the floor 10e permits the side to be slid toward the other wall and a friction lock (a screw not shown) secures the bottom bar 30c of wall to a lateral frame member 10d. This adjustment is formed at each end of the wall so that it may be uniformly adjusted as to width. The connection of bar 30c to the laterals pivots to permit the wall to pivot as a squeeze holder.

The unit provides a complete, mobile animal handling device for use in open fields with no additonal equipment. In one configuration, the unit is moved into position and the front end raised forming a chute. The end extensions are moved into vertical position for contact with another object usually a door of a vehicle. The fence sections are removed and placed into a fan shape for driving animals into the chute. The fence is fanned outwardly from the low end. A transport vehicle in position communicating with the upper end of the chute receives the animals. Animals may be driven into the catch fence and up the chute into the vehicle. For cattle cars, on a railroad track, the unit is placed into position with the open door of the cattle car, and the fence placed into catch position. The chute is thus useful where needed and no permanent facilities are available.

For treating animals, the wheeled unit is moved into the open field, and the unit lowered so the frame is resting on the ground. The fence sections placed in fan shape, opening to the chute. When caught, the fan may be closed to a holding pen. The caught animals may be placed in squeeze position so as to hold the animal for treatment. The side gates may be used for working on the animals. Where desired, the animal's head may be placed in the split front gate, for aiding holding the animal and/or placing tags in the animal's ear. When in the squeeze, one or more side gates may be opened providing access to the animal's side, flank or otherwise. When the animal treatment is completed, the sidewall squeeze is opened, and the split gate opened, releasing the animal. The chute is then ready for another animal.

What is claimed is:

1. A self contained, mobile animal handling apparatus, comprising:
   (a) frame means including a bed arranged for an animal walkway,
   (b) a wheeled under-carriage mounted having wheels mounted on pivoted lateral axes to lower at least one set of wheels to raise said frame into a travel position and raise the at least one set of wheels to lower said frame into contact with the supporting surface in a general horizontal position,
   (c) hydraulic means for raising and lowering said undercarriage including a hydraulic fluid reservoir and and a hand pump providing motivating power for said hydraulic means,
   (d) draft means depending outwardly from one end of said frame for towing,
   (e) elevating means adjustable secured at a final angle to the draft end of said frame for sloping said frame downwardly from the draft end forming as animal ramp,
   (f) upwardly depending side means mounted perpendicularly on each side of said bed forming an animal walkway,
   (g) one said side means being pivotally mounted to said bed for tilting inwardly forming an animal holding means including means for tilting said side means,
   (h) each said side means including at least one gate means arranged for opening and closing providing access to a held animal,
   (i) gate means at each end of said bed, and
   (j) closure means at the draft end of each side means arranged for filling the gap at each end of each perpendicular side when said frame is sloped downwardly from the draft end.

2. A self contained, mobile animal handling apparatus according to claim 1, wherein said elevating means includes an adjustable forwardly sloped support column at each side of said frame end, including means for adjusting the position of said frame on said support columns.

3. A self contained, mobile animal handling apparatus according to claim 1, wherein said side means includes generally vertically rigid upright end members.

4. A self contained mobile animal handling apparatus according to claim 3, wherein one said wall is movably mounted for changing the distance between the two side means.

5. A self contained, mobile animal handling apparatus according to claim 1, wherein said means for tilting said side means includes a hand lever locking said pivotal side means at its inward motion and releases said side means on outward motion.

6. A self contained, mobile animal handling apparatus according to claim 1, wherein said at least one gate is a walk in gate for a worker.

7. A self contained, mobile animal handling apparatus according to claim 1, wherein said at least one gate includes at least one stock inspection gate and a worker walk-in gate on one side.

8. A self contained, mobile animal handling apparatus according to claim 1, being further characterized by means depending from each side for supporting, for travel, a plurality of fence sections.

* * * * *